Aug. 18, 1931.　　　　M. B. TARK　　　　1,819,394
BEARING
Filed Nov. 21, 1930　　　2 Sheets-Sheet 1

Inventor
Marcus B. Tark
By Knight Bros
Attorneys

Aug. 18, 1931.  M. B. TARK  1,819,394
BEARING
Filed Nov. 21, 1930    2 Sheets-Sheet 2

Inventor
Marcus B. Tark

By Knight Bros
Attorneys

Patented Aug. 18, 1931

1,819,394

UNITED STATES PATENT OFFICE

MARCUS B. TARK, OF PHILADELPHIA, PENNSYLVANIA, ASSIGNOR TO LINK-BELT COMPANY, OF PHILADELPHIA, PENNSYLVANIA

BEARING

Original application filed June 18, 1929, Serial No. 371,876. Divided and this application filed November 21, 1930. Serial No. 497,291.

This invention relates to a bearing to be used in sewage settling tanks, where it will be submerged in liquids carrying putrescible solids and colloidal matter in suspension. The purpose of the invention is to provide a bearing on which settable solids and colloidal matter, commonly known as sewage sludge and activated sludge, will not accumulate.

In settling tanks the sludge which settles to the bottom is continuously, or at frequent intervals, removed before it has an opportunity to putrify. Putrification gives rise to bad odors and interferes with the action of the aerobic bacteria upon the impurities of the sewage. The sludge removing apparatus ordinarily includes shafts mounted in bearings submerged in the liquor and the bearings heretofore used afford lodging places for settling organic matter which require hand cleaning. My invention eliminates this difficulty in a simple manner.

The present application is a division of my copending application Serial No. 371,876, filed June 18, 1929.

In the drawings showing several forms of the invention

Figure 1:
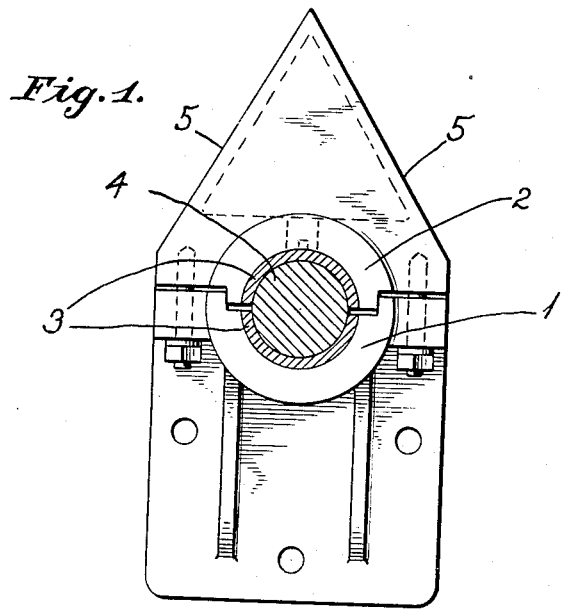
Fig. 1 is an elevation of one form taken parallel to the axis of the bearing.
Figure 3:
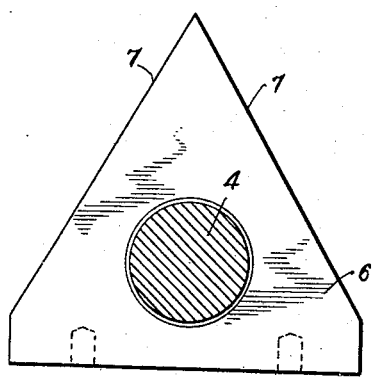
Figure 5:
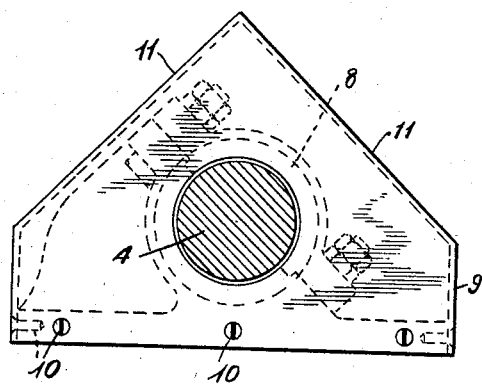
Figure 4:
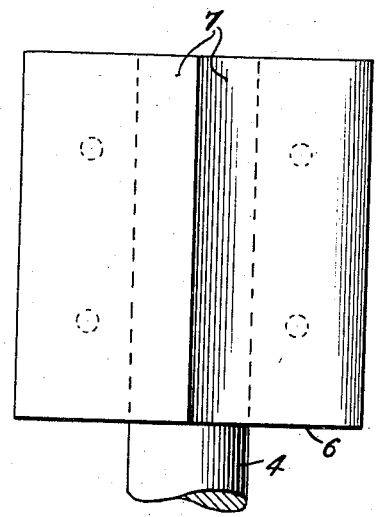
Figure 6:
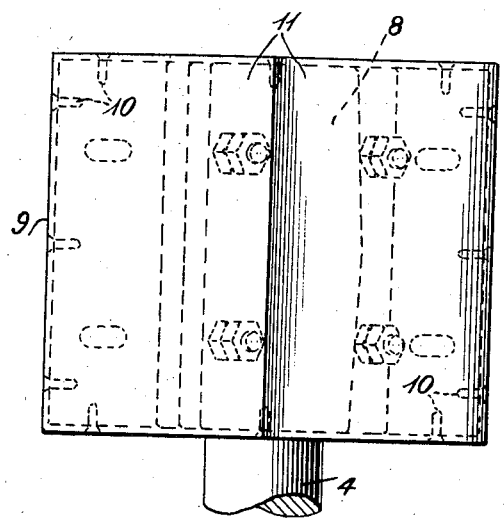

Fig 3. is an elevation of a solid peak cap bearing,

Fig. 4 is a plan of the bearing shown in Fig. 3,

Fig. 5 is an elevation of a standard bearing enclosed in a sheet metal casing to serve the same purpose as the special bearing shown in Fig. 1, and Fig. 6 is a plan of the bearing shown in Fig. 5.

Figure 2:
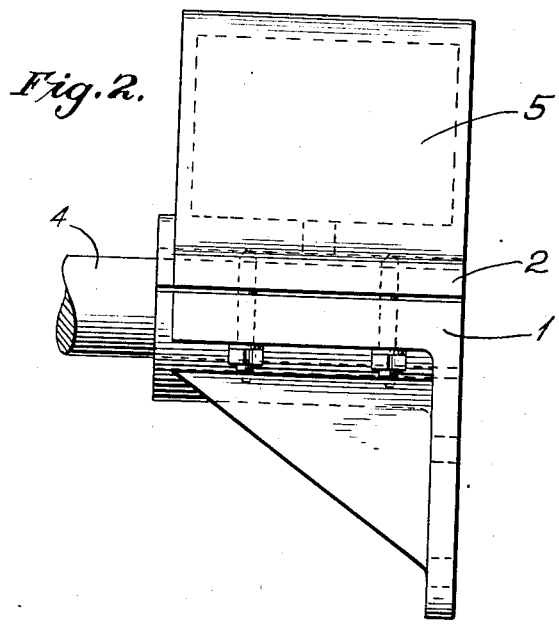
Fig. 2 is an elevation taken at right angles to Fig. 1.

The bearing shown in Figs. 1 and 2 consists of a base member 1 and cap 2, both lined with bearing metal 3 to receive the end of a shaft 4. In accordance with my invention the cap 2 has a peaked roof 5 making such an angle with the horizontal that the suspended solid matter which will be encountered in the particular place in which the bearing is to be located will not remain on the cap, but will continue its way to the bottom and so be removed.

Figs. 3 and 4 show a solid bearing 6 the sides of which form a peaked roof in accordance with my invention.

Figs. 5 and 6 show a standard bearing 8 over which is placed a peaked cap 9. The cap is secured to the base of the bearing by screws 10. The sides 11 of the cap are at such an angle that solids cannot settle on them.

I have found that an angle of 60° is sufficient to prevent the lightest solids carried by sewage from gathering on the cap.

My invention is susceptible to various modifications falling within the scope of the following claims.

I claim:

1. In a settling tank adapted to receive liquids carrying putrescible solids in suspension; a shaft; a bearing for said shaft; said bearing being completely enclosed, except for the shaft aperture, by walls which are either sharply inclined or vertical, and walls which face downward; said sharply inclined walls terminating at their lower edges only at the lateral boundaries of the bearing; whereby said bearing is without upwardly facing horizontal surfaces or pockets on which or in which solids could accumulate.

2. A bearing for use in tanks containing liquids carrying putrescible solids in suspension; said bearing being completely enclosed, except for the shaft aperture, by walls which are either sharply inclined or vertical, and walls which face downward; said sharply inclined walls terminating at their lower edges only at the lateral boundaries of the bearing; whereby said bearing is without upwardly facing horizontal surfaces or pockets on which or in which solids could accumulate.

3. A bearing completely enclosed, except for the shaft aperture, by walls which are either sharply inclined or vertical, and walls which face downward; said sharply inclined walls terminating at their lower edges only at the lateral boundaries of the bearings; whereby said bearing is without upwardly facing horizontal surfaces or pockets.

The foregoing specification signed at Philadelphia, Pennsylvania, this fifteenth day of November, 1930.

MARCUS B. TARK.